United States Patent
Ochi et al.

(10) Patent No.: US 12,463,302 B2
(45) Date of Patent: Nov. 4, 2025

(54) SECONDARY BATTERY

(71) Applicant: MURATA MANUFACTURING CO., LTD., Kyoto (JP)

(72) Inventors: Masato Ochi, Kyoto (JP); Kenta Eguchi, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 534 days.

(21) Appl. No.: 17/973,921

(22) Filed: Oct. 26, 2022

(65) Prior Publication Data

US 2023/0049098 A1 Feb. 16, 2023

Related U.S. Application Data

(63) Continuation of application No. PCT/JP2021/016661, filed on Apr. 26, 2021.

(30) Foreign Application Priority Data

Apr. 30, 2020 (JP) ................. 2020-080579

(51) Int. Cl.
*H01M 50/559* (2021.01)
*H01M 10/0525* (2010.01)
*H01M 50/109* (2021.01)

(52) U.S. Cl.
CPC ..... *H01M 50/559* (2021.01); *H01M 10/0525* (2013.01); *H01M 50/109* (2021.01)

(58) Field of Classification Search
None
See application file for complete search history.

(56) References Cited

U.S. PATENT DOCUMENTS

| 2015/0017501 | A1 | 1/2015 | Harayama |
| 2016/0336554 | A1 | 11/2016 | Negishi et al. |
| 2017/0222194 | A1 | 8/2017 | Kajita et al. |
| 2018/0069200 | A1 | 3/2018 | Ono et al. |
| 2022/0077504 | A1* | 3/2022 | Kashimura ....... H01M 10/0587 |

FOREIGN PATENT DOCUMENTS

| JP | 2005056648 A | 3/2005 |
| JP | 2017139079 A | 8/2017 |
| JP | 2019046639 A | 3/2019 |
| JP | 2019133802 A | 8/2019 |
| WO | 2015/115557 A1 | 8/2015 |

OTHER PUBLICATIONS

Japanese Office Action issued Nov. 7, 2023 in corresponding Japanese Application No. 2022-518058.
(Continued)

*Primary Examiner* — Wyatt P Mcconnell
(74) *Attorney, Agent, or Firm* — K&L Gates LLP

(57) ABSTRACT

Provided is a secondary battery including an electrode assembly and an exterior body that houses the electrode assembly. In the secondary battery, the exterior body includes a metal plate joined via an insulating material interposed therebetween, and the exterior body has a cavity, and one of a peripheral edge of the cavity and an outer edge of the metal plate is bent so as to be separated from the insulating material.

20 Claims, 9 Drawing Sheets

(56) References Cited

OTHER PUBLICATIONS

Chinese Office Action issued Sep. 28, 2023 in corresponding Chinese Application No. 202180031043.4.
European Search Report dated Jul. 29, 2024 for corresponding EP application No. 21795644.0 (8 pages).
International Search Report of corresponding PCT application PCT/JP2021/016661, dated Jul. 6, 2021.
Japanese Office Action issued Mar. 5, 2024 in corresponding Japanese Application No. 2022-518058.

* cited by examiner (a)

(b)

SECONDARY BATTERY

CROSS REFERENCE TO RELATED APPLICATIONS

The present application is a continuation of PCT patent application no. PCT/JP2021/016661, filed on Apr. 26, 2021, which claims priority to Japanese patent application no. JP2020-080579, filed on Apr. 30, 2020, the entire contents of which are incorporated herein by reference.

BACKGROUND

The present application relates to a secondary battery, such as, a secondary battery provided with an electrode assembly including an electrode constituting layer including a positive electrode, a negative electrode, and a separator.

The secondary battery can be repeatedly charged and discharged due to a so-called storage battery, and is used for various applications. For example, the secondary battery has been used in mobile devices such as mobile phones, smartphones, and notebook computers.

SUMMARY

The present application relates to a secondary battery.

The present application relates to overcoming a problem in a known secondary battery, and a need to take measures therefor.

For example, as illustrated in FIG. 10, in a known secondary battery 100 such as a lithium ion secondary battery, a flat plate-shaped metal plate 120 is bonded as an electrode terminal 101 to a metal exterior body or an exterior case 130 via an insulating material or a seal member 140 interposed therebetween.

As illustrated in FIG. 10, an electrode assembly 110 including an electrode constituting layer including, for example, a positive electrode, a negative electrode, and a separator is disposed inside the exterior body 130 of the secondary battery 100. A tab 160 extending from one of the positive electrode and the negative electrode of the electrode assembly 110 is electrically connected to the metal plate 120. A tab 170 extending from the other of the positive electrode and the negative electrode is electrically connected to the exterior body 130. Therefore, each of the metal plate 120 and the exterior body 130 can function as an electrode terminal (positive electrode terminal or negative electrode terminal).

For example, as illustrated in FIG. 11, view (A), the insulating material 240 also having a cavity is concentrically aligned and disposed on the upper side of the exterior body 230 (for example, may be provided as a lid-shaped member having a disc shape and the rest as a cup-shaped member) having a cavity, and further, the flat plate-shaped metal plate 220 is concentrically disposed on the upper side thereof, and pressed in the direction of the arrow while being heated, so that the electrode terminal 201 as illustrated in FIG. 11, view (B), (sectional view in a diameter direction) can be formed by thermal fusion of the insulating material 240 which can be made of, for example, a thermoplastic resin. Therefore, as illustrated in FIG. 11, view (C), a tab 260 extending from the electrode assembly can be electrically connected to the metal plate 220 through the cavities of the exterior body 230 and the insulating material 240. Such an insulating material 240 can also prevent an electrical short circuit between the metal plate 220 and the exterior body 230.

However, since the electrode terminal 201 using such a metal plate 220 has a flat plate shape, the present application have found that the metal plate 220 may be peeled off from the insulating material 240 due to, for example, an increase in pressure inside the battery. In addition, it has been found by the present application that the insulating material 240 may also be peeled off from the exterior body 230 in the same manner. From the above, it was found that the insulating property between the metal plate and the exterior body was deteriorated, and the safety of the battery itself was deteriorated.

The present application has been made in view of such problems. That is, the present application relates to providing a secondary battery in which insulating property and sealing property between a metal plate provided as an electrode terminal and an exterior body are further improved.

The present application is directed to solving the above problems by addressing in a new direction instead of addressing in an extension of the related art.

A secondary battery according to the present application including:
an electrode assembly; and an exterior body that houses the electrode assembly,
wherein the exterior body includes a metal plate joined via an insulating material interposed therebetween, and
the exterior body has a cavity, and one of a peripheral edge of the cavity and an outer edge of the metal plate is bent toward the insulating material.

In the present disclosure, the secondary battery may be referred to as a "secondary battery of the present disclosure".

In the present application, it is possible to obtain a secondary battery in which insulating property and sealing property between a metal plate provided as an electrode terminal and an exterior body are further improved according to an embodiment. Note that the effects described in the present specification are merely examples and are not limited, and additional effects may be provided.

DETAILED DESCRIPTION

Figure 1:
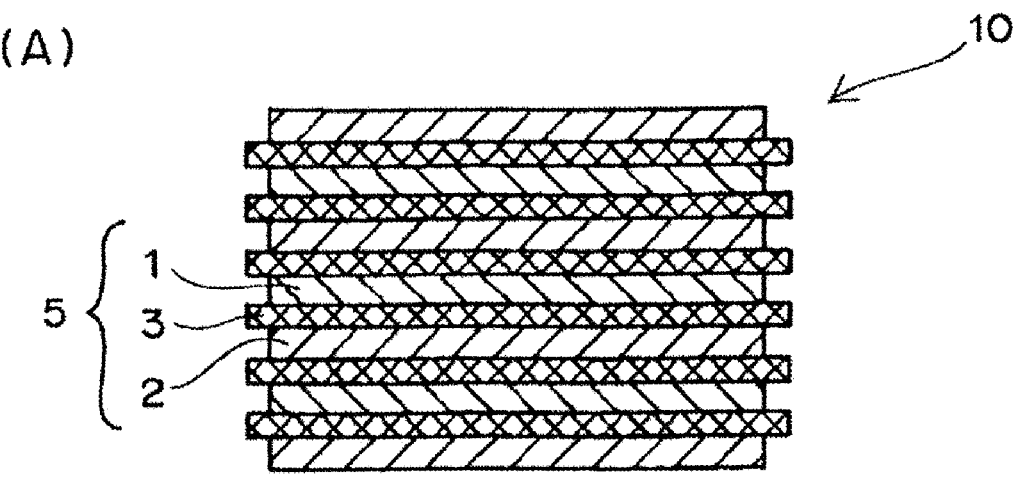
FIG. 1 is a sectional view schematically illustrating a configuration of an electrode assembly (view (A): an electrode assembly having a non-wound planar stacking type structure, and view (B): an electrode assembly having a wound type structure).
Figure 1:
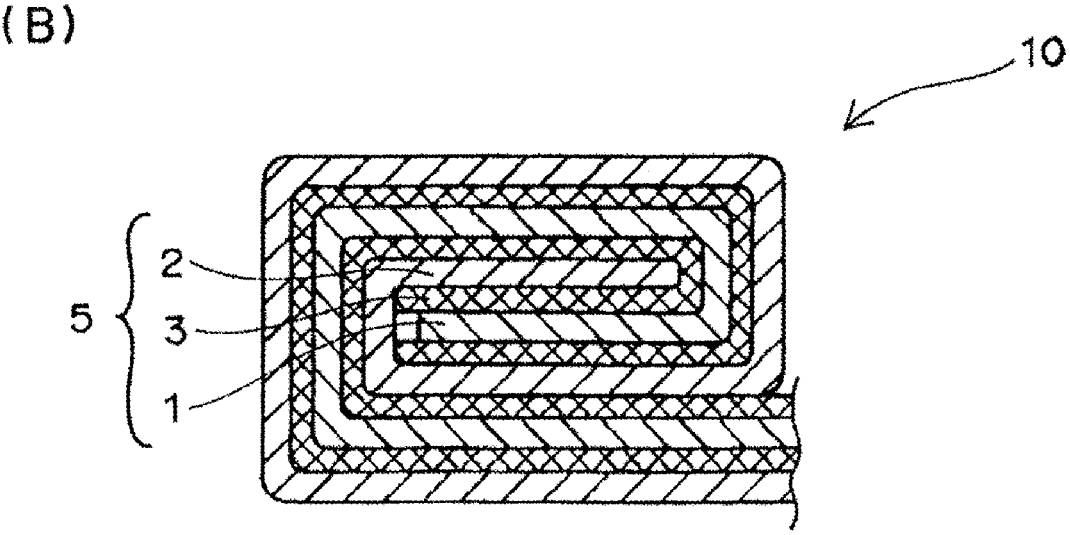

Hereinafter, the present application will be described in more detail including with reference to a secondary battery according to an embodiment. Although the description will be made with reference to the drawings as necessary, various elements in the drawings are only schematically and exemplarily illustrated for the understanding of the present application, and appearances and/or dimensional ratios may be different from actual ones.

The "sectional view" described directly or indirectly in the present specification is basically based on a virtual cross section obtained by cutting the secondary battery along a stacking direction or an overlapping direction of the electrode assembly or the electrode constituting layer that constitute the secondary battery (refer to FIG. 1). Similarly, the direction of a "thickness" described directly or indirectly in the present specification is basically based on the stacking direction of the electrode materials constituting the secondary battery. For example, in the case of a "secondary battery having a thickness in a plate shape" having a button shape, a coin shape, or the like, the direction of the "thickness" corresponds to a plate thickness direction of the secondary battery. The term "plan view" or "plan view shape" used in the present specification is based on a sketch drawing when an object is viewed from the upper side or the lower side along the thickness direction (that is, the stacking direction).

Further, the "vertical direction" and "horizontal direction" used directly or indirectly in the present specification correspond to a vertical direction and a horizontal direction in the drawings, respectively. Unless otherwise specified, the same reference numerals or symbols indicate the same members or portions or the same semantic contents. In one preferred aspect, while the stacking direction of the electrode assembly can correspond to the vertical direction, it can be considered that a vertical downward direction (that is, a direction in which gravity acts) corresponds to a "downward direction" and the opposite direction corresponds to an "upward direction".

The various numerical ranges referred to herein are intended to include the lower limit and upper limit numerical values themselves, unless otherwise noted, such as "less than" or "greater than/greater than".

In the present specification, the term "secondary battery" refers to a battery that can be repeatedly charged and discharged. Therefore, the secondary battery of the present disclosure is not excessively limited by its name, and for example, a power storage device and the like can also be included in the target.

The secondary battery of the present disclosure includes, for example, an electrode assembly in which electrode constituting layers including a positive electrode, a negative electrode, and a separator are stacked. For example, FIG. 1, views (A) and (B) schematically illustrate an electrode assembly 10. As illustrated, a positive electrode 1 and a negative electrode 2 may be stacked with a separator 3 interposed therebetween to form an electrode constituting layer 5. The electrode assembly may be configured by stacking at least one or more of the electrode constituting layers 5. In FIG. 1, view (A), the electrode constituting layer 5 has a planar stacking type structure in which the electrode constituting layers 5 are stacked in a planar shape. On the other hand, FIG. 1, view (B), has a wound stacking structure in which the electrode constituting layer 5 is wound in a wound shape. That is, in FIG. 1, view (B), an electrode constituting layer including a positive electrode, a negative electrode, and a separator disposed between the positive electrode and the negative electrode has a wound stacking type structure (for example, a jelly roll structure) in which the electrode constituting layer is wound in a roll shape.

In other words, the electrode assembly 10 may have a planar stacking type structure in which the electrode constituting layers 5 are stacked so as to be stacked on each other, for example, as illustrated in FIG. 1, view (A). Alternatively, the electrode assembly 10 may have a wound type structure in which the electrode constituting layer 5 extending relatively long in a band shape is wound in a roll shape, for example, as illustrated in FIG. 1, view (B).

FIG. 1, view (B), merely illustrates the wound type structure of the electrode assembly, and the electrode assembly may be disposed in the exterior body with the cross section illustrated in FIG. 1, view (B), set to the "upward direction" or the "downward direction".

In the secondary battery, such an electrode assembly may be enclosed in an exterior body together with an electrolyte (for example, a non-aqueous electrolyte). Note that the structure of the electrode assembly is not necessarily limited to the planar stacking type structure (refer to FIG. 1, view (A)) or the wound stacking type structure (refer to FIG. 1, view (B)). For example, the electrode assembly may have a so-called stack-and-folding type structure in which the positive electrode, the separator, and the negative electrode are stacked on a long film and then folded.

The positive electrode is formed of at least a positive electrode material layer and, if necessary, a positive electrode current collector. In the positive electrode, for example, a positive electrode material layer is provided on at least one surface of a positive electrode current collector. The positive electrode material layer contains a positive electrode active material as an electrode active material. For example, in each of the plurality of positive electrodes in the electrode assembly, the positive electrode material layer may be provided on both surfaces of the positive electrode current collector, or the positive electrode material layer may be provided only on one surface of the positive electrode current collector. For example, the positive electrode current collector may have a foil form. That is, the positive electrode current collector may be formed of a metal foil.

The negative electrode is formed of at least a negative electrode material layer and, if necessary, a negative electrode current collector. In the negative electrode, for example, a negative electrode material layer is provided on at least one surface of a negative electrode current collector. The negative electrode material layer contains a negative electrode active material as an electrode active material. For example, in each of the plurality of negative electrodes in the electrode assembly, the negative electrode material layer may be provided on both surfaces of the negative electrode current collector, or the negative electrode material layer may be provided only on one surface of the negative electrode current collector. For example, the negative electrode current collector may have a foil form. That is, the negative electrode current collector may be formed of a metal foil.

The electrode active materials that can be contained in the positive electrode material layer and the negative electrode material layer, that is, the positive electrode active material and the negative electrode active material are substances that can directly participate in the transfer of electrons in the secondary battery, and are main substances of the positive electrode and the negative electrode that are responsible for charge and discharge, that is, a battery reaction.

More specifically, ions can be brought in the electrolyte due to the "positive electrode active material which can be contained in the positive electrode material layer" and the "negative electrode active material which can be contained in the negative electrode material layer". Such ions move between the positive electrode and the negative electrode to transfer electrons, and charging and discharging are performed.

The positive electrode material layer and the negative electrode material layer are may be layers capable of occluding and releasing lithium ions. That is, the secondary battery according to an embodiment may be a non-aqueous electrolyte secondary battery in which lithium ions can move to charge and discharge the battery with the non-aqueous electrolyte interposed between the positive electrode and the negative electrode.

When the lithium ions are involved in charging and discharging, the secondary battery according to an embodiment may correspond to a so-called "lithium ion battery". In the lithium ion battery, a positive electrode and a negative electrode have a layer capable of occluding and releasing lithium ions.

The positive electrode active material of the positive electrode material layer can be formed of, for example, a granular material, and a binder may be contained in the positive electrode material layer for sufficient contact between particles and shape retention. A conductive auxiliary agent ma y be contained in the positive electrode material layer in order to more smoothly transfer of electrons promoting the battery reaction.

The negative electrode active material of the negative electrode material layer can be formed of, for example, a granular material, and a binder may be contained in the negative electrode material layer for sufficient contact between particles and shape retention. A conductive auxiliary agent ma y be contained in the negative electrode material layer in order to more smoothly transfer of electrons promoting the battery reaction.

As described above, since a plurality of components are contained, the positive electrode material layer and the negative electrode material layer can also be referred to as a "positive electrode mixture layer" and a "negative electrode mixture layer", respectively.

The positive electrode active material may be, for example, a material that contributes to occlusion and release of lithium ions. From such a viewpoint, the positive electrode active material may be, for example, a lithium-containing composite oxide. More specifically, the positive electrode active material may be a lithium transition metal composite oxide containing lithium and at least one transition metal selected from the group consisting of cobalt, nickel, manganese, and iron.

That is, in the positive electrode material layer of the secondary battery according to an embodiment, such a lithium transition metal composite oxide may be contained as a positive electrode active material. For example, the positive electrode active material may be lithium cobaltate, lithium nickelate, lithium manganate, lithium iron phosphate, or a material obtained by replacing a part of these transition metals with another metal.

Such a positive electrode active material may be contained as a single type, but two or more types may be contained in combination.

The binder that can be contained in the positive electrode material layer is not particularly limited, and examples thereof include at least one selected from the group consisting of polyvinylidene fluoride, a vinylidene fluoride-hexafluoropropylene copolymer, a vinylidene fluoride-tetrafluoroethylene copolymer, and polytetrafluoroethylene.

The conductive auxiliary agent that can be contained in the positive electrode material layer is not particularly limited, and examples thereof include at least one selected from carbon black such as thermal black, furnace black, channel black, ketjen black, and acetylene black, carbon fibers such as graphite, carbon nanotube and vapor-grown carbon fiber, metal powders such as copper, nickel, aluminum, and silver, and polyphenylene derivatives.

The thickness dimension of the positive electrode material layer is not particularly limited, and may be 1 µm or more and 300 µm or less, and is, for example, 5 µm or more and 200 µm or less. The thickness dimension of the positive electrode material layer is the thickness inside the secondary battery, and an average value of measured values at optional 10 points may be adopted.

The negative electrode active material may be a material that contributes to occlusion and release of lithium ions. From such a viewpoint, the negative electrode active material may be various carbon materials, oxides, and/or lithium alloys, metallic lithium, or the like.

Examples of various carbon materials of the negative electrode active material include graphite (specifically, natural graphite and/or artificial graphite), hard carbon, soft carbon, and/or diamond-like carbon. In particular, graphite is preferable because it has high electron conductivity and excellent adhesion to the negative electrode current collector.

Examples of the oxide of the negative electrode active material include at least one selected from the group consisting of silicon oxide, tin oxide, indium oxide, zinc oxide, and lithium oxide.

Such an oxide may be amorphous as its structural form. This is because deterioration due to nonuniformity such as crystal grain boundaries or defects is less likely to occur.

The lithium alloy of the negative electrode active material may be any alloy of metal that can be alloyed with lithium, and may be, for example, a binary, ternary, or higher alloy of lithium and a metal such as Al, Si, Pb, Sn, In, Bi, Ag, Ba, Ca, Hg, Pd, Pt, Te, Zn, or La.

Such an alloy is preferably amorphous as its structural form. This is because deterioration due to nonuniformity such as crystal grain boundaries or defects is less likely to occur.

The binder that can be contained in the negative electrode material layer is not particularly limited, and examples thereof include at least one selected from the group consisting of styrene butadiene rubber, polyacrylic acid, polyvinylidene fluoride, a polyimide-based resin, and a polyamideimide-based resin.

The conductive auxiliary agent that can be contained in the negative electrode material layer is not particularly limited, and examples thereof include at least one selected from carbon black such as thermal black, furnace black, channel black, ketjen black, and acetylene black, carbon fibers such as graphite, carbon nanotube and vapor-grown carbon fiber, metal powders such as copper, nickel, aluminum, and silver, and polyphenylene derivatives.

The thickness dimension of the negative electrode material layer is not particularly limited, and may be 1 μm or more and 300 μm or less, and is, for example, 5 μm or more and 200 μm or less. The thickness dimension of the negative electrode material layer is the thickness inside the secondary battery, and an average value of measured values at optional 10 points may be adopted.

The positive electrode current collector and the negative electrode current collector which can be used for the positive electrode and the negative electrode are members that can collect and supply electrons generated in the electrode active material due to the battery reaction. Such an electrode current collector may be a sheet-like metal member. Such an electrode current collector may have a porous or perforated form. For example, the current collector may be a plate, a metal foil, a punching metal, a net, an expanded metal, or the like.

The positive electrode current collector used for the positive electrode may be formed of a metal foil containing at least one selected from the group consisting of aluminum, stainless steel (SUS), nickel, and the like. The positive electrode current collector may be, for example, an aluminum foil.

The negative electrode current collector used for the negative electrode may be formed of a metal foil containing at least one selected from the group consisting of copper, stainless steel (SUS), nickel, and the like. The negative electrode current collector may be, for example, a copper foil.

In the present disclosure, "stainless steel" (SUS) refers to, for example, stainless steel defined in "JIS G0203 Iron and Steel Terms", and may be chromium or alloy steel containing chromium and nickel.

The thickness dimension of each of the positive electrode current collector and the negative electrode current collector is not particularly limited, and may be 1 μm or more and 100 μm or less, and is, for example, 10 μm or more and 70 μm or less. The thickness dimension of each of the positive electrode current collector and the negative electrode current collector is the thickness inside the secondary battery, and an average value of measured values at optional 10 points may be adopted.

The separator obtained by using the positive electrode and the negative electrode is a member which may be provided from the viewpoint of preventing a short circuit due to contact between the positive and negative electrodes, holding the electrolyte, and the like. In other words, it can be said that the separator is a member that can allow ions to pass while preventing electronic contact between the positive electrode and the negative electrode.

For example, the separator may be a porous or microporous insulating member, and have a membrane form due to its small thickness. Although it is merely an example, a microporous membrane formed of polyolefin may be used as the separator.

The microporous membrane which may be used as the separator may contain, for example, only polyethylene (PE) or a material containing only polypropylene (PP), as polyolefin. Furthermore, the separator may be a laminate which can be formed of a "microporous membrane formed of PE" and a "microporous membrane formed of PP". The surface of the separator may be covered with an inorganic particle coating layer and/or an adhesive layer. The surface of the separator may have adhesiveness.

The thickness dimension of the separator is not particularly limited, and may be 1 μm or more and 100 μm or less, and is, for example, 2 μm or more and 20 μm or less. The thickness dimension of the separator is the thickness inside the secondary battery (particularly, the thickness between the positive electrode and the negative electrode), and an average value of measured values at optional 10 points may be adopted.

In the present application, the separator is not necessarily limited by its name, and may be a solid electrolyte, a gel electrolyte, and/or insulating inorganic particles that can have a similar function.

In the secondary battery according to an embodiment, for example, an electrode assembly including an electrode constituting layer including a positive electrode, a negative electrode, and a separator may be enclosed in an exterior body together with an electrolyte. The electrolyte can assist movement of metal ions released from the electrode (positive electrode and/or negative electrode). The electrolyte may be a "non-aqueous" electrolyte containing an organic electrolyte and/or an organic solvent, or may be an "aqueous" electrolyte containing water.

When the positive electrode and the negative electrode have, for example, a layer capable of occluding and releasing lithium ions, the electrolyte is preferably a "non-aqueous" electrolyte (hereinafter, referred to as a "non-aqueous electrolyte") containing a lithium ion-containing electrolyte or an organic electrolyte and/or an organic solvent. That is, the electrolyte is preferably a non-aqueous electrolyte. In the electrolyte, metal ions released from the electrode (positive electrode and/or negative electrode) are present, and therefore the electrolyte can assist the movement of metal ions in the battery reaction.

The secondary battery according to an embodiment is preferably a non-aqueous electrolyte secondary battery using a "non-aqueous" electrolyte containing a "non-aqueous" solvent and a solute as an electrolyte. The electrolyte may have a form such as a liquid form or a gel form (in the present specification, the "liquid" non-aqueous electrolyte is also referred to as a "non-aqueous electrolyte solution").

The non-aqueous electrolyte is preferably an electrolyte containing a non-aqueous solvent and a solute. The specific solvent of the non-aqueous electrolyte may contain at least carbonate. Such carbonates may be cyclic carbonates and/or chain carbonates.

Although not particularly limited, examples of the cyclic carbonates include at least one selected from the group consisting of propylene carbonate (PC), ethylene carbonate (EC), butylene carbonate (BC), and vinylene carbonate (VC).

Examples of the chain carbonates include at least one selected from the group consisting of dimethyl carbonate (DMC), diethyl carbonate (DEC), ethyl methyl carbonate (EMC), and dipropyl carbonate (DPC).

Although it is merely an example, in a preferred embodiment, a combination of cyclic carbonates and chain carbonates may be used as the non-aqueous electrolyte, and for example, a mixture of ethylene carbonate (EC) and diethyl carbonate (DEC), a mixture of ethylene carbonate (EC) and ethyl methyl carbonate (EMC), or the like may be used. As a specific solute of the non-aqueous electrolyte, for example, a Li salt such as $LiPF_6$ and/or $LiBF_4$ may be used.

In the present disclosure, the "exterior body" of the secondary battery generally means a member capable of housing or enclosing an electrode assembly in which electrode constituting layers including a positive electrode, a negative electrode, and a separator are stacked. The exterior body may be an exterior body having electrical conductivity or conductivity, or may be a metal exterior body. In addition, such a metal exterior body may have a two-part configuration which can be formed of a cup-shaped member and a lid-shaped member.

In the present disclosure, the "cup-shaped member" means a member including a side surface portion corresponding to a body portion and a main surface portion (in an exemplary aspect, for example, the lower surface) continuous with the side surface portion, in which a hollow portion is formed inside.

In the present disclosure, the "lid-shaped member" means a member provided to cover such a cup-shaped member. The lid-shaped member may be, for example, a single member (typically a flat plate-shaped member) extending in the same plane. In the exterior body, the lid-shaped member and the cup-shaped member may be optionally combined so that the lid-shaped member and the upper end portion of the cup-shaped member are engaged with or bonded to or fitted to each other.

The "cup-shaped member" and the "lid-shaped member" may be joined together by a welding process, which may enable relatively simple encapsulation of the electrode assembly.

In the present application, the above configuration may be appropriately changed or modified as necessary.

The secondary battery of the present application is characterized with respect to an exterior body capable of enclosing or housing an electrode assembly and peripheral components thereof. In particular, it is characterized with elements related to an exterior body of a secondary battery and an electrode terminal (a positive electrode terminal and/or a negative electrode terminal) that can be attached to the exterior body.

In the secondary battery, a joining region between the exterior body and the electrode terminal is a region that has not been observed before. The electrode terminal of the secondary battery can be formed of, for example, a metal plate or the like, is provided on the exterior body via an insulating material interposed therebetween, and is configured to be electrically connected to a tab (or lead) that can extend from the electrode assembly. For example, the exterior body is provided with a cavity through which a tab or the like passes, and an electrode terminal such as a metal plate is joined onto a surface around the cavity via an insulating material interposed therebetween. In other words, the exterior body is provided with a metal plate joined (or bonded or bound or adhered) via an insulating material. That is, in the joining region, the insulating material can be sandwiched between the metal plate and the exterior body.

The secondary battery is mainly characterized in that one of the "peripheral edge of the cavity of the exterior body" and the "outer edge of the metal plate" is "bent so as to be separated from the insulating material" (refer to FIGS. 1 to 8). Hereinafter, the secondary battery will be described more specifically with reference to one or more embodiments.

Figure 2:
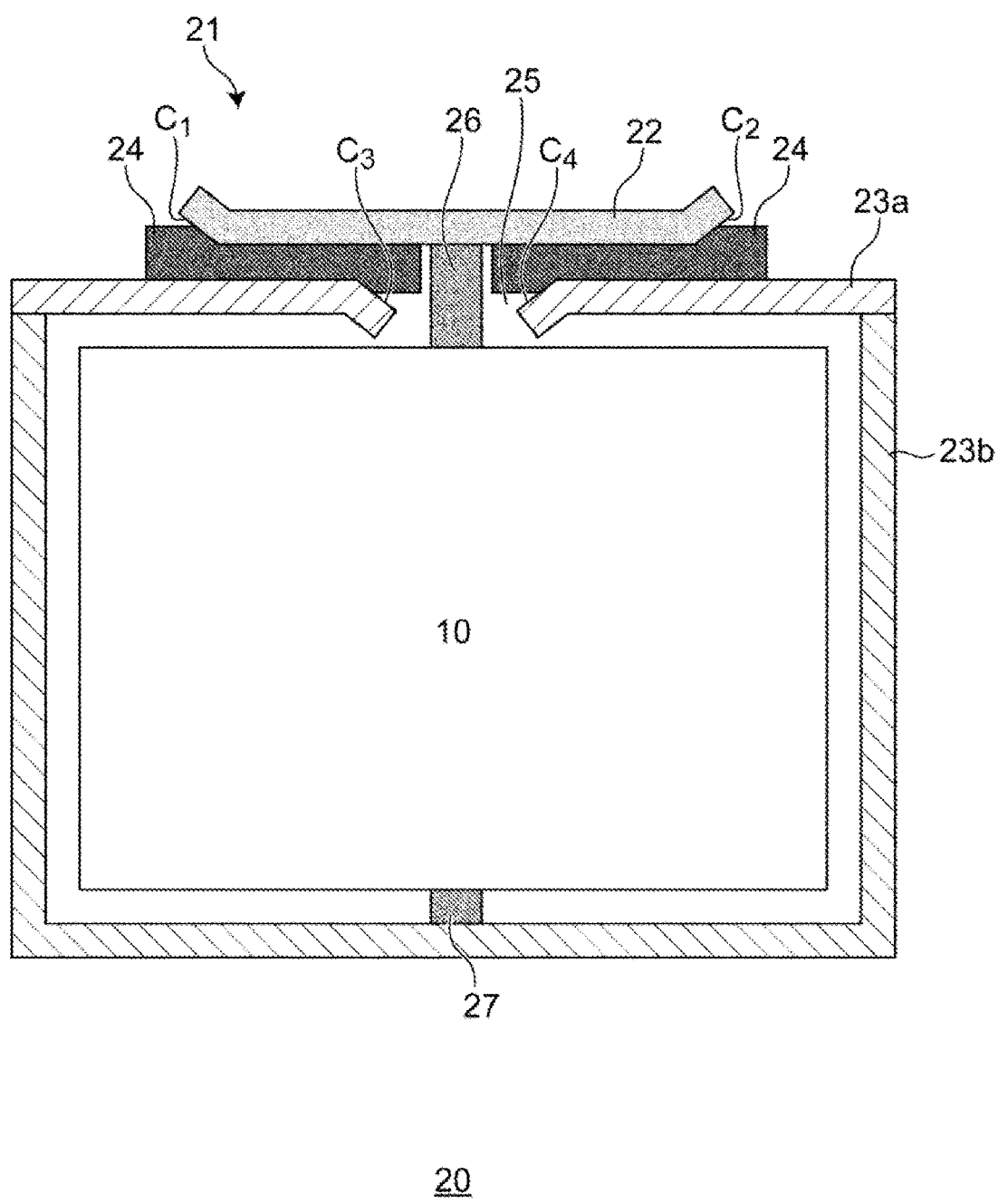
FIG. 2 is a schematic sectional view schematically illustrating a secondary battery according to an embodiment of the present application.

For example, as illustrated in FIG. 2, a secondary battery 20 according to an embodiment includes an electrode assembly 10 (refer to FIG. 1) and an exterior body (23) capable of housing the electrode assembly 10.

As described in detail below, the exterior body is preferably a metal exterior body, and may be formed of, for example, a lid-shaped member 23a and a cup-shaped member 23b as illustrated in FIG. 2 (hereinafter, may be collectively referred to as an "exterior body 23").

The exterior body 23 (specifically, the lid-shaped member 23a) is provided with a metal plate 22 joined (or bonded or bound or adhered) with an insulating material 24 interposed therebetween. A cavity may be provided in each of the lid-shaped member 23a of the exterior body 23 and the insulating material 24 in the same manner as in the related art (refer to FIG. 11). Through the cavity, a tab 26 that can extend from one of the positive electrode and the negative electrode of the electrode assembly 10 is electrically connected to the metal plate 22. Such a metal plate 22 can function as the electrode terminal 21 (one of the positive electrode terminal and the negative electrode terminal). The tab 27 that can extend from the other of the positive electrode and the negative electrode of the electrode assembly 10 may be electrically connected to, for example, the cup-shaped member 23b, and such a cup-shaped member 23b can function as the other electrode terminal (the other of the positive electrode terminal and the negative electrode terminal). In other words, in an embodiment illustrated in FIG. 2, the electrode terminal 21 formed of the metal plate 22 can function as one of the positive electrode terminal and the negative electrode terminal, and the exterior body 23 (specifically, the cup-shaped member 23b) can function as the other of the positive electrode terminal and the negative electrode terminal.

Here, with respect to the exterior body, in the secondary battery 30 of another embodiment illustrated in FIG. 3, the exterior body is formed of a cup-shaped member 33a and a lid-shaped member 33b (hereinafter, the exterior body may be collectively referred to as an "exterior body 33".). Accordingly, in an embodiment illustrated in FIG. 3, the electrode terminal 31 formed of the metal plate 32 can function as one of the positive electrode terminal and the negative electrode terminal, and the exterior body 33 (specifically, the lid-shaped member 33b) can function as the other of the positive electrode terminal or the negative electrode terminal.

In the present application, for example, as schematically illustrated in FIGS. 2 to 7, one of the "peripheral edge of the cavity of the exterior body" and the "outer edge of the metal plate" is "bent so as to be separated from the insulating material".

In the present disclosure, the "peripheral edge of the cavity of the exterior body" means at least a part of the peripheral edge portion or the peripheral portion of the cavity of the "exterior body" described in detail below.

In the present disclosure, the "outer edge of the metal plate" means at least a part of the outer edge portion or the outer peripheral portion of the "metal plate" described in detail below.

In the present disclosure, "bent so as to be separated from the insulating material" means that "the peripheral edge of the cavity of the exterior body" or "the outer edge of the metal plate" is curved or bent upward and/or downward the surface to be separated from the insulating material.

Specifically, as illustrated in FIG. 2, the outer edge of the metal plate 22 is bent so as to be separated from (or upward) the insulating material 24 (bent portions are denoted by $C_1$, $C_2$). Further, a peripheral edge of the cavity 25 of the exterior body 23 (specifically, the lid-shaped member 23a) is also bent so as to be separated from (downward) the insulating material 24 (bent portions are denoted by $C_3$, $C_4$).

Figure 3:
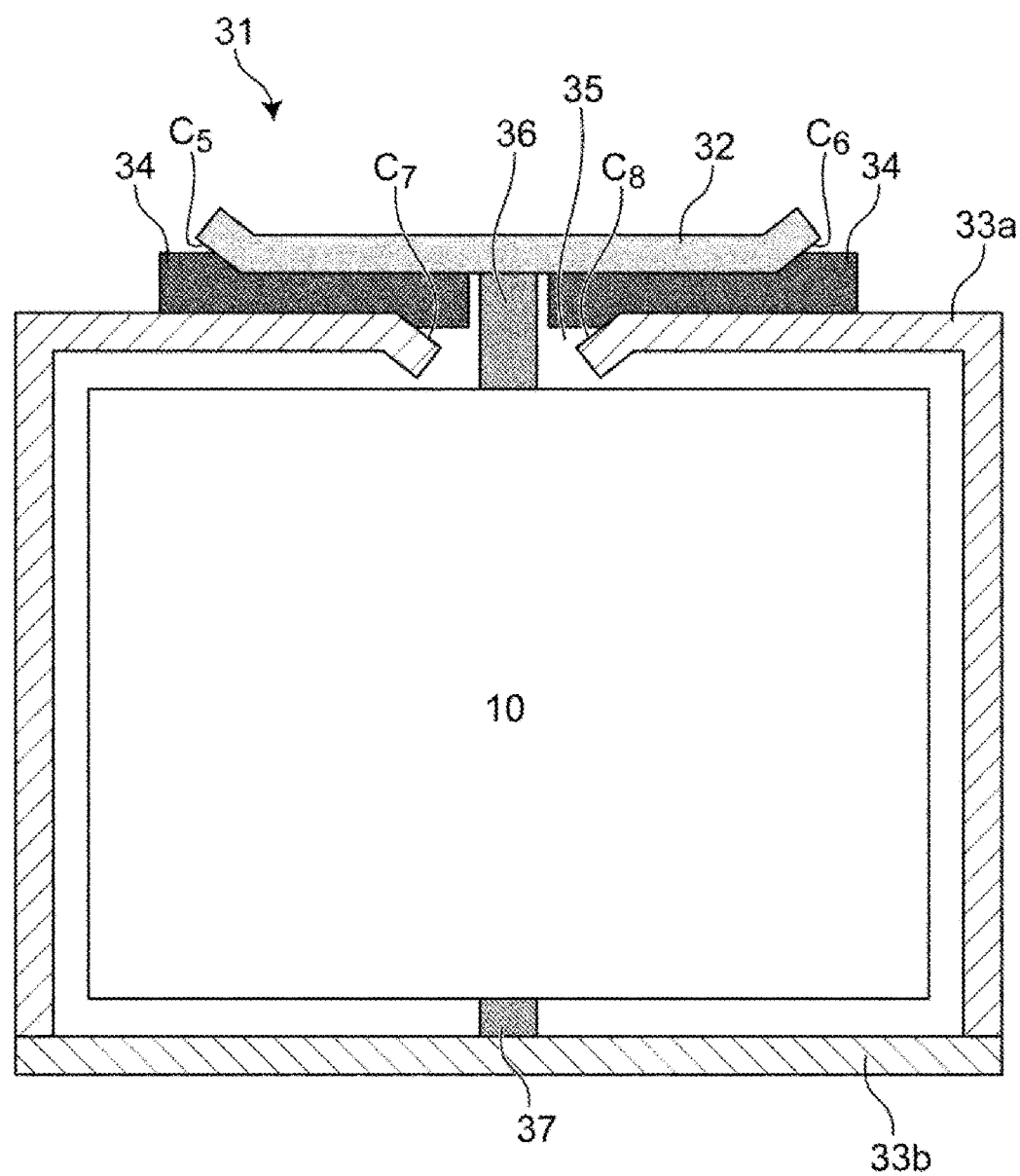
FIG. 3 is a schematic sectional view schematically illustrating a secondary battery according to another embodiment of the present application.

Similarly, also in an embodiment illustrated in FIG. 3, the outer edge of the metal plate 32 is bent so as to be separated from (or upward) the insulating material 34 (bent portions are denoted by $C_5$, $C_6$). Further, a peripheral edge of the cavity 35 of the exterior body 33 (specifically, the cup-shaped member 33a) is also bent so as to be separated from (downward) the insulating material 34 (bent portions are denoted by $C_7$, $C_8$).

Hereinafter, bent portions of the metal plate and the exterior body illustrated in FIGS. 2 and 3 will be described more specifically with reference to, for example, a partial sectional view of FIG. 4.

Figure 4:
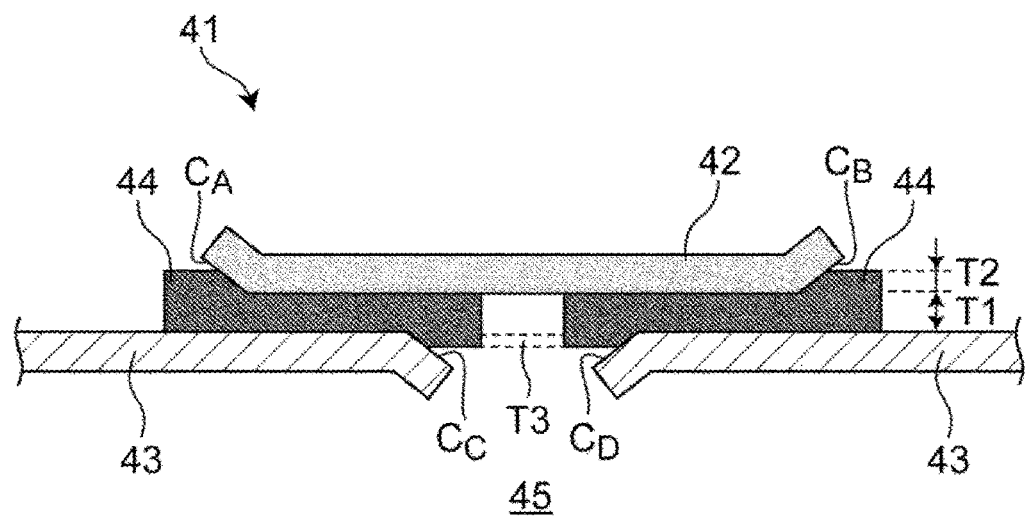
FIG. 4 is a schematic sectional view schematically illustrating a configuration around an electrode terminal of a secondary battery according to an embodiment of the present application.

As illustrated in FIG. 4, the metal plate 42 is joined (or bonded, bound, or adhered) to the exterior body 43 (only a part thereof is illustrated) via an insulating material 44, which may be formed of resin or the like, interposed therebetween. The outer edge of the metal plate 42 is bent so as to be separated from (or upward) the insulating material 44 (bent portions $C_A$, $C_B$). A peripheral edge of the cavity 45 of the exterior body 43 is also bent so as to be separated from (or downward) the insulating material 44 (bent portions $C_C$, $C_D$). In other words, both the outer edge of the metal plate 42 and the peripheral edge of the cavity 45 of the exterior body 43 are bent so as to be separated from the insulating material 44 (or so as to be separated from each other). In the present application, any one of the outer edge of the metal plate and the peripheral edge of the cavity of the exterior body may be bent so as to be separated from the insulating material.

The bent portions ($C_A$, $C_B$) of the metal plate 42 are preferably provided on the entire circumference of the metal plate 42. For example, when the metal plate 42 has a circular shape in top view as in the related art (refer to FIG. 11), the bent portions ($C_A$, $C_B$) of the metal plate 42 can be present or extend concentrically with the metal plate 42.

In addition, it is preferable that bent portions ($C_C$, $C_D$) of the exterior body 43 are also provided on the entire circumference of the cavity 45. For example, when the cavity 45 has a circular shape in top view as in the related art (refer to FIG. 11), the bent portions ($C_C$, $C_D$) of the exterior body 43 can be present or extend concentrically with the cavity 45.

The bent portions ($C_A$ to $C_D$) may be formed at an angle larger than 0° and equal to or smaller than 90°, and preferably at an angle larger than 5° and equal to or smaller than 45° with respect to a horizontal plane, a metal plate, or an exterior body.

The bent portions ($C_A$ to $C_D$) may be formed at a height (a height of a portion protruding from a surface) larger than 0% and equal to or smaller than 20% with respect to the thickness of the metal plate 42 or the exterior body 43.

The bent portions ($C_A$ to $C_D$) may be formed within a range of 50% or less from an edge portion (or a contour portion) of the metal plate 42 or the exterior body 43 as viewed in a top plan view based on a thickness of the metal plate or the exterior body.

Such bent portions ($C_A$ to $C_D$) can be formed by, for example, punching or pressing of a metal member using a mold. In addition, such portions ($C_A$ to $C_D$) may include burrs and the like that can be generated by the above-described processing and the like.

At least a part of the bent portions ($C_A$ to $C_D$) of the metal plate 42 and the exterior body 43 is preferably surrounded or covered with insulating material 44 as illustrated in FIG. 4, for example. Since at least a part of the bent portions ($C_A$ to $C_D$) is surrounded by the insulating material 44 as in the illustrated aspect, the insulating property and the sealing property between the metal plate 42 and the exterior body 43 are improved. As a result, the safety of the battery itself is improved.

In other words, in at least a part of the bent portions ($C_A$ to $C_D$) of the metal plate 42 and the exterior body 43, for example, as illustrated in FIG. 4, the insulating material 44 is preferably relatively thick around the bent portion. This is because a space can be formed around the bent portion by forming the bent portion. For example, the thickness may be increased by $T_2$, $T_3$ with respect to the thickness $T_1$ of the insulating material 44 between the metal plate 42 and the exterior body 43. At this time, it is preferable that a relatively thick portion of the insulating material 44 is in contact with bent portions ($C_A$ to $C_D$) of the metal plate 42 and the exterior body 43 as illustrated in FIG. 4.

More specifically, with respect to a thickness $T_1$ of the insulating material 44 (or a distance between metal plate 42 and exterior body 43), the thickness may be increased by $T_2$ at the outer edge portion of the insulating material 44, and the thickness may be increased by $T_3$ around the cavity.

With respect to the thicknesses $T_1$, $T_2$ is, for example, within a range of 5% or more and 50% or less, and $T_3$ is, for example, within a range of 5% or more and 50% or less.

By increasing the thickness of the insulating material 44 in this manner, the contact area between the insulating material 44 and the metal plate 42 and the contact area between the insulating material 44 and the exterior body 43 are increased, so that the insulating property is improved. In addition, it is possible to improve the binding property or the bonding force between the insulating material 44 and the metal plate 42 and the binding property or the bonding force between the insulating material 44 and the exterior body 43. As a result, the sealing property of the secondary battery can be improved.

Figure 5:
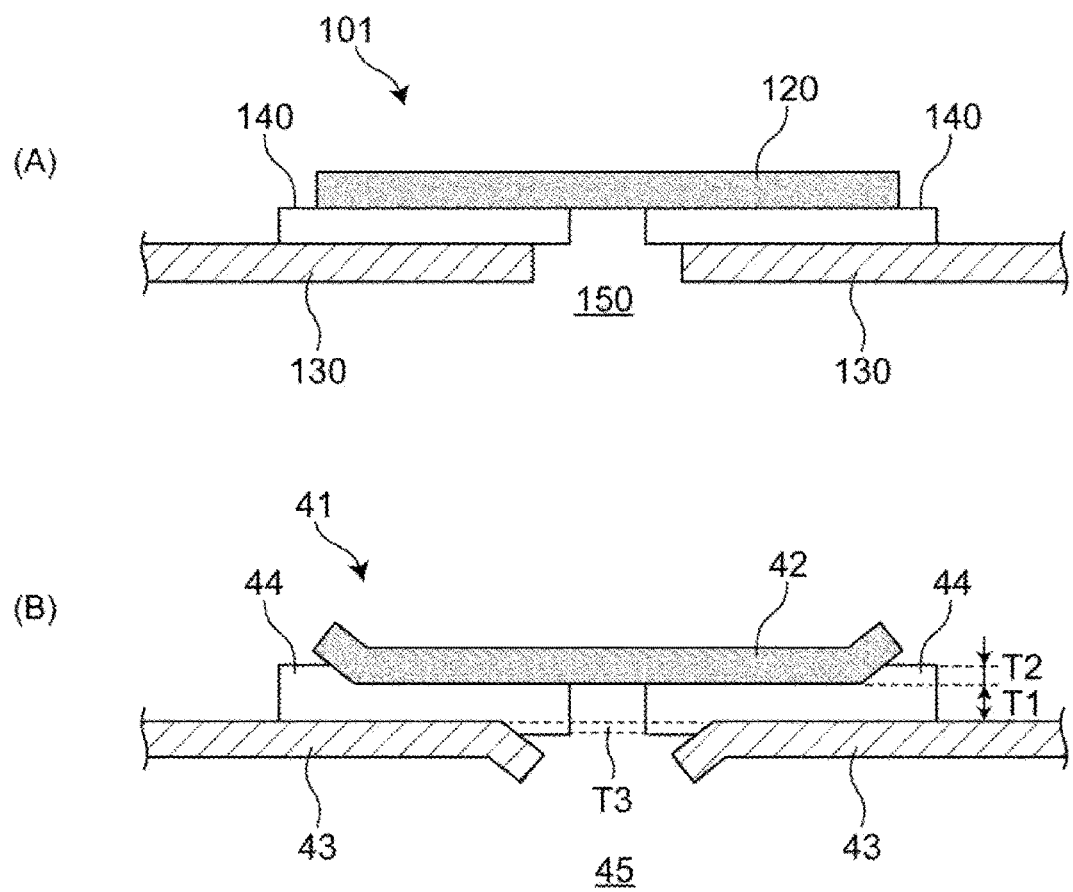
FIG. 5 is a schematic sectional view schematically illustrating a change or an increase in thickness of an insulating material of the secondary battery.
Figure 10:
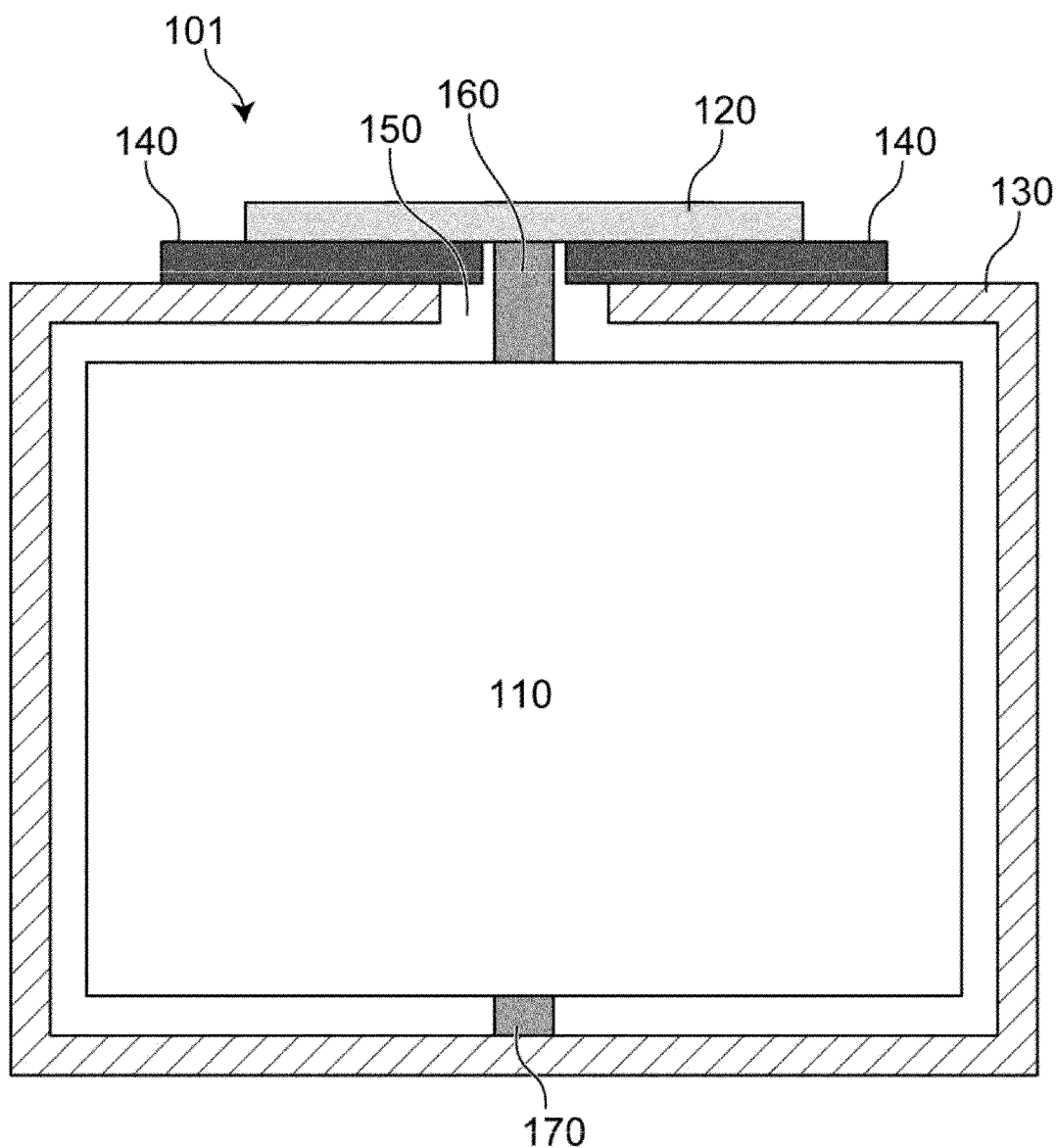
FIG. 10 is a schematic sectional view schematically illustrating a secondary battery in the related art.

Here, in an electrode terminal of the secondary battery in the related art, for example, an electrode terminal 101 as illustrated in FIG. 10, a flat metal plate 120 is disposed on an upper surface of a flat exterior body 130 via an insulating material 140 interposed therebetween, as illustrated in FIG. 5, view (A), for example.

On the other hand, in the secondary battery of the present disclosure, for example, as illustrated in FIG. 5, view (B), since both the metal plate 42 and the exterior body 43 are bent so as to be separated from the insulating material 44, at least a part of the periphery of such a bent portion may be surrounded in contact with the insulating material 44, and the thickness of the insulating material 44 may be thick ($T_2$, $T_3$). Therefore, by providing such a bent portion, the insulating property and the binding property can be enhanced as compared with the related art. As a result, the sealing property of the secondary battery can be improved.

The improvement of the insulating property and the binding property due to the bent portion as described above, and the like are effects obtained by bending any one of the outer edge portion (that is, the outer edge) of the metal plate and the peripheral edge portion (that is, the peripheral edge) of the cavity of the exterior body so as to be separated from the insulating material. Therefore, the other of the outer edge of the metal plate and the peripheral edge of the cavity of the exterior body may be bent toward the insulating material instead of being separated from the insulating material.

Figure 6:
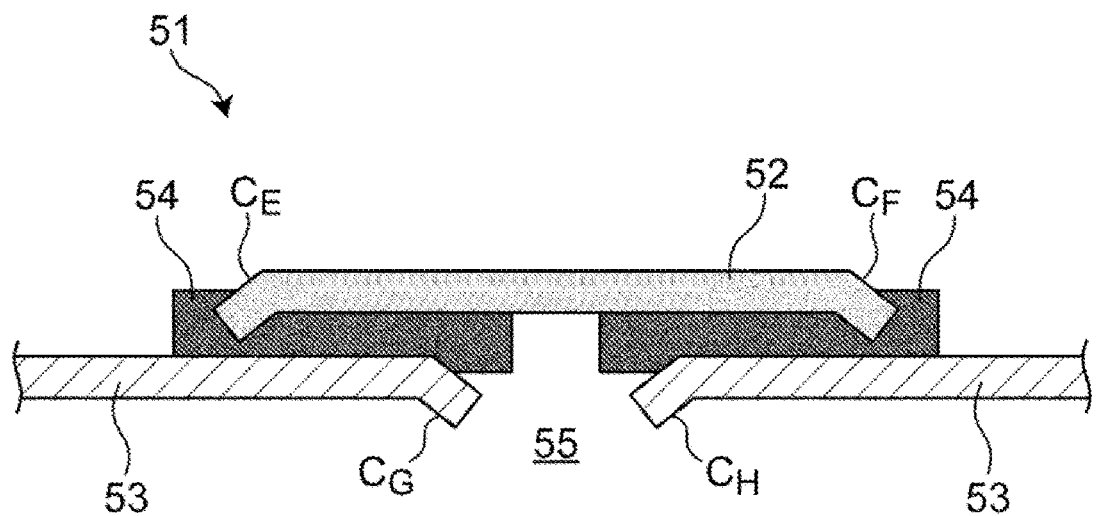
FIG. 6 is a schematic sectional view schematically illustrating a configuration around an electrode terminal of a secondary battery according to another embodiment of the present application.

For example, as illustrated in FIG. 6, the metal plate 52 may be bent toward (or downward) the insulating material 54 (bent portions are denoted by $C_E$, $C_F$). As described above, in the aspect illustrated in FIG. 6, the metal plate 52 may be bent toward (or downward) the insulating material 54 ($C_E$, $C_F$), and the exterior body 53 may be bent so as to be separated from (or downward) the insulating material 54 (bent portions are denoted by $C_G$, $C_H$). Therefore, in the aspect illustrated in FIG. 6, as compared with the aspect illustrated in FIG. 4, the direction in which the metal plate 52 is bent is opposite.

Even in the aspect as illustrated in FIG. 6, similarly to the aspect illustrated in FIG. 4, at least a part of the periphery of the bent portions ($C_G$, $C_H$) of the exterior body 53 is surrounded by the insulating material 54, so that the thickness of the insulating material 54 is increased, and the insulating property between the metal plate 52 and the exterior body 53 is improved. In addition, it is also possible to improve the sealing property of the secondary battery.

Figure 7:
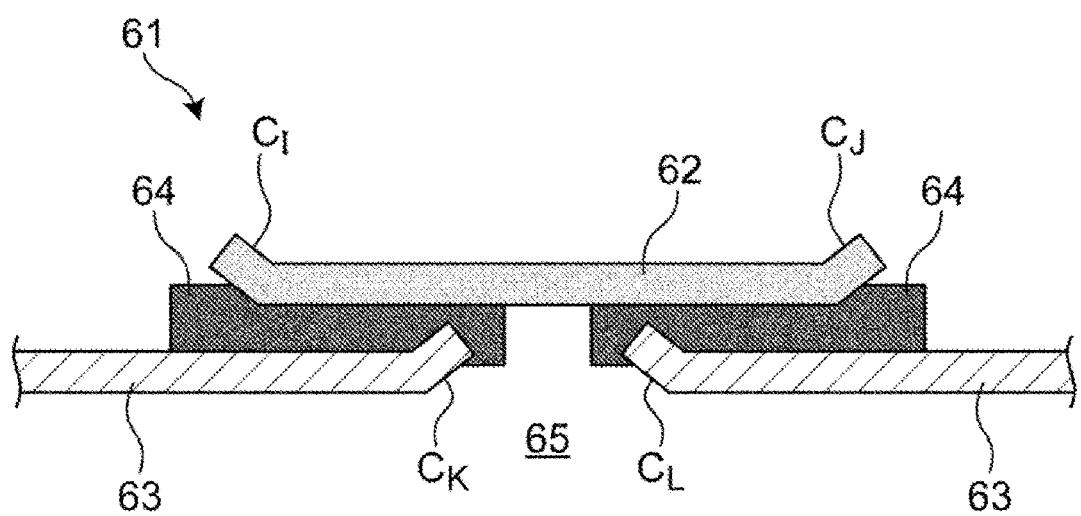
FIG. 7 is a schematic sectional view schematically illustrating a configuration around an electrode terminal of a secondary battery according to still another embodiment of the present application.

Further, in the aspect illustrated in FIG. 7, the exterior body 63 may be bent toward (or upward) the insulating material 64 (bent portions are denoted by $C_K$, $C_L$). As described above, in the aspect illustrated in FIG. 7, the exterior body 63 may be bent toward (or upward) the insulating material 64 ($C_K$, $C_L$), and the metal plate 62 may be bent so as to be separated from (or upward) the insulating material 64 (bent portions are denoted by $C_I$, $C_J$). Therefore, in the aspect illustrated in FIG. 7, as compared with the aspect illustrated in FIG. 4, the direction in which the exterior body 63 is bent is opposite.

Even in the aspect as illustrated in FIG. 7, at least a part of the periphery of the bent portions ($C_I$, $C_J$) of the metal plate 62 is surrounded by the insulating material 64, so that the thickness of the insulating material 64 is increased, and the insulating property between the metal plate 62 and the exterior body 63 is improved. In addition, it is also possible to improve the sealing property of the secondary battery.

As described above, in the secondary battery of the present disclosure, for example, as illustrated in FIGS. 2 to 7 and the like, it is preferable that the exterior body has a cavity, and one of a peripheral edge of the cavity of the exterior body and an outer edge of the metal plate is bent so as to be separated from the insulating material. With such a configuration, the insulating property can be improved. In addition, it is also possible to improve the sealing property of the secondary battery.

Further, as illustrated in FIGS. 2 to 4 and 5, view (B), and the like, in the secondary battery of the present disclosure, the other one of the peripheral edge of the cavity of the exterior body and the outer edge of the metal plate may also be bent so as to be separated from the insulating material. In other words, both the peripheral edge of the cavity of the exterior body and the outer edge of the metal plate may be bent so as to be separated from the insulating material. With such a configuration, the insulating property can be further improved (FIG. 5(B)).

Alternatively, as illustrated in FIGS. 6, 7, and the like, in the secondary battery of the present disclosure, the other of the peripheral edge of the cavity of the exterior body and the outer edge of the metal plate may be bent toward the insulating material instead of being separated from the insulating material. In other words, the peripheral edge of the cavity of the exterior body and the outer edge of the metal plate may be bent in the same direction. Even with such a configuration, the insulating property can be sufficiently improved. In addition, when the other of the peripheral edge of the cavity of the exterior body and the outer edge of the metal plate is bent toward the insulating material, for example, as illustrated in FIGS. 6 and 7, the bent portion enters or is buried in the insulating material, and the binding property with the insulating material is further improved ($C_E$, $C_F$ in FIG. 6 and $C_K$, $C_L$ in FIG. 7). In addition, it is also possible to improve the sealing property of the secondary battery.

In the secondary battery of the present disclosure, the bent portion of the peripheral edge of the cavity of the exterior body and/or the bent portion of the outer edge of the metal plate may be sharp. In particular, in the aspects illustrated in FIGS. 6 and 7, the entry of the bent portion of the metal plate or the exterior body into the insulating material becomes easier, which is preferable ($C_E$, $C_F$ in FIG. 6 and $C_K$, $C_L$ in FIG. 7).

Hereinafter, materials and the like of members that can constitute the secondary battery of the present disclosure will be described.

In the present disclosure, the "electrode terminal" (hereinafter, sometimes referred to as a "terminal member" or simply a "terminal") means a terminal such as an external terminal and an output terminal that can be provided for electrical connection with the outside (or outside the secondary battery, specifically, an external device or the like) in the secondary battery. The terminal member may have a substantially flat plate shape except for the bent portion described above. The terminal member may be formed of, for example, a metal plate as described above. The metal plate may have a plurality of layers formed of different metal materials.

The material of the terminal member is not particularly limited, and may include at least one metal (including an alloy) selected from the group consisting of aluminum, nickel, stainless steel (SUS), and copper. More specifically, the terminal member may be formed of an aluminum-nickel clad material or the like. The plan view shape of the terminal member is also not particularly limited, and may be, for example, a substantially circular shape, or may be a substantially rectangular shape including a substantially quadrangular shape or a substantially semicircular shape. In the present disclosure, a plurality of terminal members, specifically, two or more terminal members may be provided.

In the present disclosure, the "insulating material" (hereinafter, also referred to as an "insulating member" or a "sealing member") means a member which is interposed between the exterior body and the terminal member and can contribute to "insulation" between the exterior body and the terminal member. The type of the insulating material is not particularly limited as long as it exhibits "insulating property". Preferably, the insulating material has not only "insulating property" but also "fusibility" (or thermal adhesiveness).

As the "insulating material", for example, a material containing a resin material or an elastomer material can be used.

As the resin material, a thermoplastic resin, preferably a heat-sealable resin can be used. Examples of the thermoplastic resin include a polyolefin-based resin such as polyethylene and/or polypropylene, preferably polypropylene, and a copolymer thereof. As the insulating material, a single-layer film of a thermoplastic resin or a multilayer film containing a thermoplastic resin can be used. Examples of the multilayer film include a multilayer heat-sealable film in which both surfaces of a high-melting-point resin layer to be an intermediate layer are sandwiched between low-melting-point resin layers (thermoplastic resin layers). Examples of the elastomer material include polyester-based thermoplastic elastomers.

The insulating material may have a film form. That is, the insulating material may have a film form, that is, a thin form. For example, the insulating material may be provided using a film-like insulating material precursor having a form close to the final shape.

Viewed from another aspect, the insulating material may contain a component of an adhesive having insulating property. Examples of such an adhesive include an acrylic adhesive such as an acrylic acid ester copolymer, a rubber adhesive such as natural rubber, a silicone adhesive such as silicone rubber, a urethane adhesive such as a urethane resin, an α-olefin adhesive, an ether adhesive, an ethylene-vinyl acetate resin adhesive, an epoxy resin adhesive, a vinyl chloride resin adhesive, a chloroprene rubber adhesive, a cyanoacrylate adhesive, an aqueous polymer-isocyanate adhesive, a styrene-butadiene rubber adhesive, a nitrile rubber adhesive, a nitrocellulose adhesive, a reactive hot-melt adhesive, a phenol resin adhesive, a modified silicone adhesive, a polyamide resin adhesive, a polyimide adhesive, a polyurethane resin adhesive, a polyolefin resin adhesive, a polyvinyl acetate resin adhesive, a polystyrene resin solvent adhesive, a polyvinyl alcohol adhesive, a polyvinyl pyrrolidone resin adhesive, a polyvinyl butyral resin adhesive, a polybenzimidazole adhesive, a polymethacrylate resin adhesive, a melamine resin adhesive, a urea resin adhesive, and/or a resorcinol-based adhesive.

The plan view shape of the insulating material is not particularly limited, and may be, for example, a circular shape as in the related art (FIG. 11), or may be a substantially rectangular shape including a substantially quadrangular shape.

The insulating material preferably has an outer shape or area larger than that of the terminal member in a plan view shape thereof.

The insulating material may have a cavity as in the related art (FIG. 11), but the shape, size, arrangement, position, and the like are not particularly limited. The cavity which can be provided in the insulating portion is preferably smaller in size and area than the cavity which can be provided in the exterior body.

In the present disclosure, the "exterior body" means a member capable for enclosing or housing an electrode assembly in which electrode constituting layers including a positive electrode, a negative electrode, and a separator are stacked. For example, the exterior body may be a flexible case having a laminate structure or the like, or a hard case having a non-laminate structure such as a metal exterior body.

The exterior body may be a metal exterior body having a non-laminate configuration. In such a case, the exterior body is not a laminate member including a metal sheet, a fusion layer, and a protective layer. That is, it has a non-laminate configuration.

The metal exterior body having the non-laminate configuration may have a configuration including a single metal member. For example, such a metal exterior body may be a single member formed of metal such as stainless steel (SUS) and/or aluminum.

The exterior body in the present disclosure may contain an alloy as a metal.

In the present disclosure, the term "metal single member" means that the exterior body does not have a so-called laminate configuration in a broad sense, and means that the exterior body is a member substantially made only of metal in a narrow sense. Therefore, the surface of the metal exterior body may be subjected to an appropriate surface treatment as long as the metal exterior body is formed of substantially only metal.

For example, on a cut surface obtained by cutting such a metal exterior body in a thickness direction thereof, a single metal layer can be confirmed except for a portion subjected to surface treatment or the like.

In addition, the shape, size, arrangement, position, and the like of the cavity that can be provided in the exterior body are not particularly limited.

The metal exterior body may have a relatively thin thickness. For example, the metal exterior body may have a thickness dimension of 50 μm or more and less than 200 μm, for example, 50 μm or more and 190 μm or less, 50 μm or more and 180 μm or less, or 50 μm or more and 170 μm or less.

As the "electrode assembly", a known electrode assembly in the related art can be used, and for example, the one described in the above may be appropriately used as necessary. For example, an electrode assembly having a planar stacking type structure in which the electrode constituting layers 5 illustrated in FIG. 1, view (A), are stacked in a planar shape, an electrode assembly having a wound stacking type structure in which the electrode constituting layers 5 illustrated in FIG. 1, view (B), are wound in a wound shape, or the like may be used.

In the present disclosure, the "tab" means a conductive member that can be electrically connected to the positive electrode or the negative electrode of the electrode assembly, and protrudes or extends from the electrode assembly. Such a tab can be attached to the inner main surface of the terminal member at least through the cavity of the exterior body, and can be responsible for electrical connection between the terminal member and the electrode layer of any one of the positive electrode and the negative electrode of the electrode assembly. Such a tab may extend from the "current collector" (that is, the "positive electrode current collector" and the "negative electrode current collector") described above, and is preferably integrally formed of the same material as the current collector.

Figure 8:
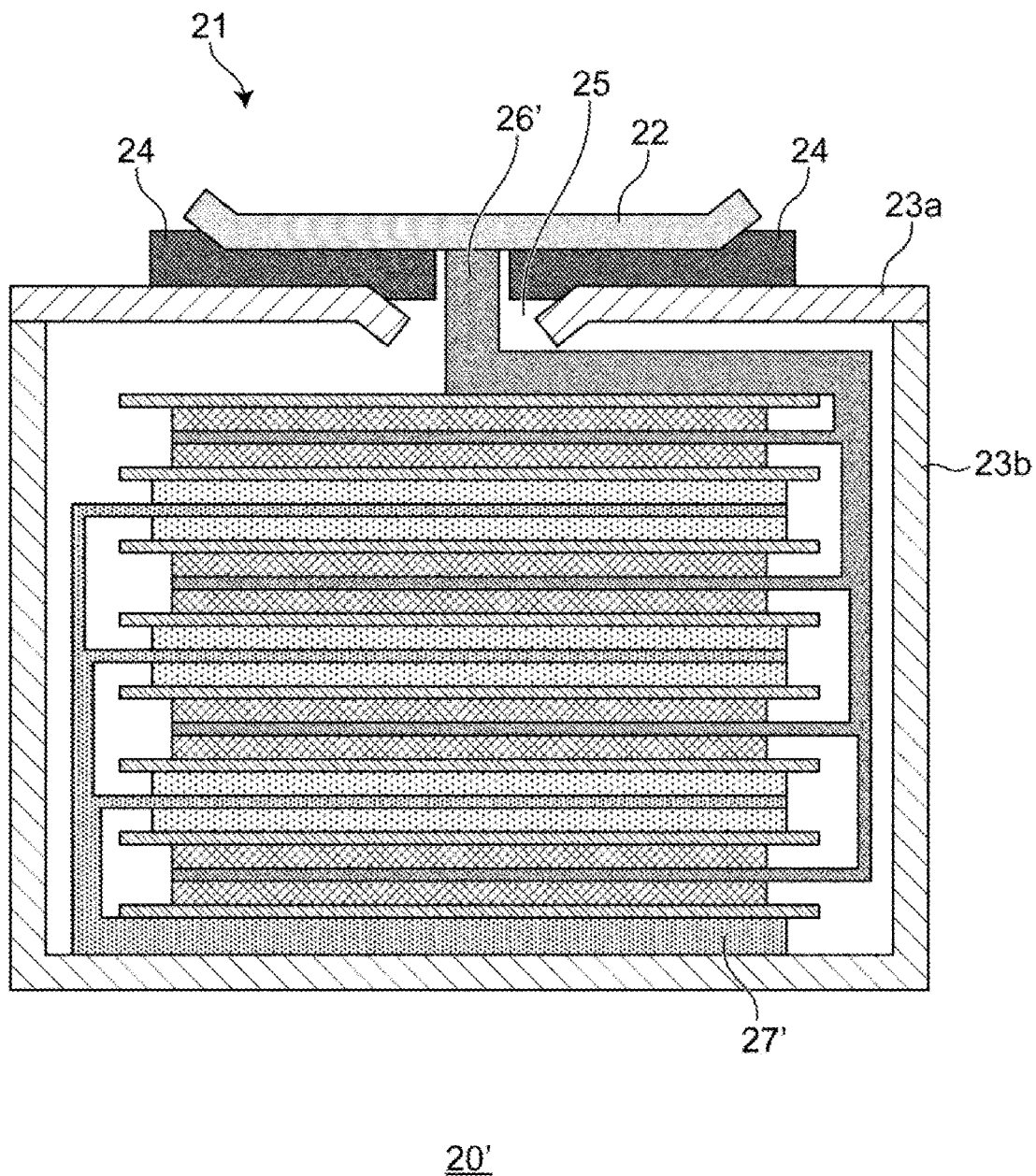
FIG. 8 is a schematic sectional view schematically illustrating a secondary battery according to a preferred embodiment of the present application.

For example, as a preferred embodiment of the secondary battery 20 illustrated in FIG. 2, for example, FIG. 8 illustrates the secondary battery 20' in which an electrode assembly having a planar stacking type structure illustrated in, for example, FIG. 1, view (A), is disposed inside an exterior body 23 which may be formed of a lid-shaped member 23a and a cup-shaped member 23b. One of the positive electrode and the negative electrode of the electrode assembly, preferably the positive electrode, is electrically connected to the metal plate 22, that is, the electrode terminal 21 via the tab 26', and the other of the positive electrode and the negative electrode (preferably the negative electrode) is electrically connected to the exterior body (specifically, the cup-shaped member 23b) via the tab 27' interposed therebetween.

The tab 26' is preferably integrally formed from the same material as the positive electrode current collector which may be disposed on the positive electrode. The tab 27' is preferably integrally formed from the same material as the negative electrode current collector which may be disposed on the negative electrode.

As the electrode assembly of the secondary battery 20' illustrated in FIG. 8, an electrode assembly having a wound type stacking structure illustrated in FIG. 1, view (B), may be used.

As described above, in the secondary battery of the present disclosure, the metal plate is preferably an electrode terminal. It is more preferable that the electrode terminal is one of the positive electrode and the negative electrode, and the exterior body is the other of the positive electrode and the negative electrode. In the secondary battery of the present disclosure, in particular, the electrode terminal is preferably a positive electrode, and the exterior body is preferably a negative electrode. With such a configuration, the negative electrode can be made larger than the positive electrode.

Figure 9:
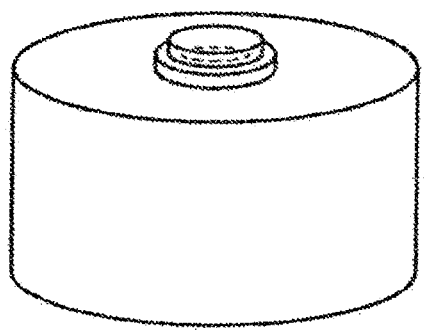
FIG. 9 is a perspective view schematically illustrating a secondary battery having a button shape or a coin shape (a) and a square shape (b).
Figure 9:
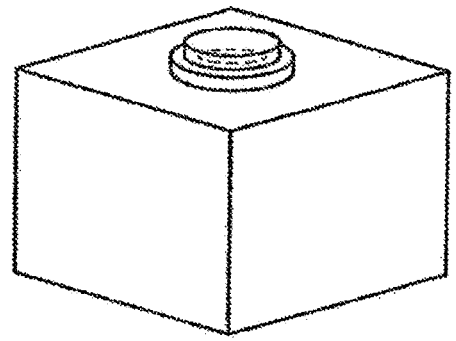

The secondary battery of the present disclosure is preferably a "secondary battery having a circular shape in plan view", and more preferably a secondary battery having a button shape or a coin shape (refer to, for example, FIG. 9(a)). However, the secondary battery of the present disclosure is not limited to a secondary battery having a button shape or a coin shape. The secondary battery of the present disclosure may be, for example, a secondary battery having an angular shape (refer to, for example, FIG. 9(b)). That is, the plan view shape of the secondary battery of the present disclosure is not limited to a circular shape, and may have a shape such as a substantially quadrangular shape or a substantially rectangular shape.

In the secondary battery of the present disclosure, the electrode of the electrode assembly preferably includes a positive electrode and a negative electrode capable of occluding and releasing lithium ions. Such a secondary battery can be used as a lithium ion secondary battery. However, the secondary battery of the present disclosure is not limited to a lithium ion secondary battery.

Figure 11:
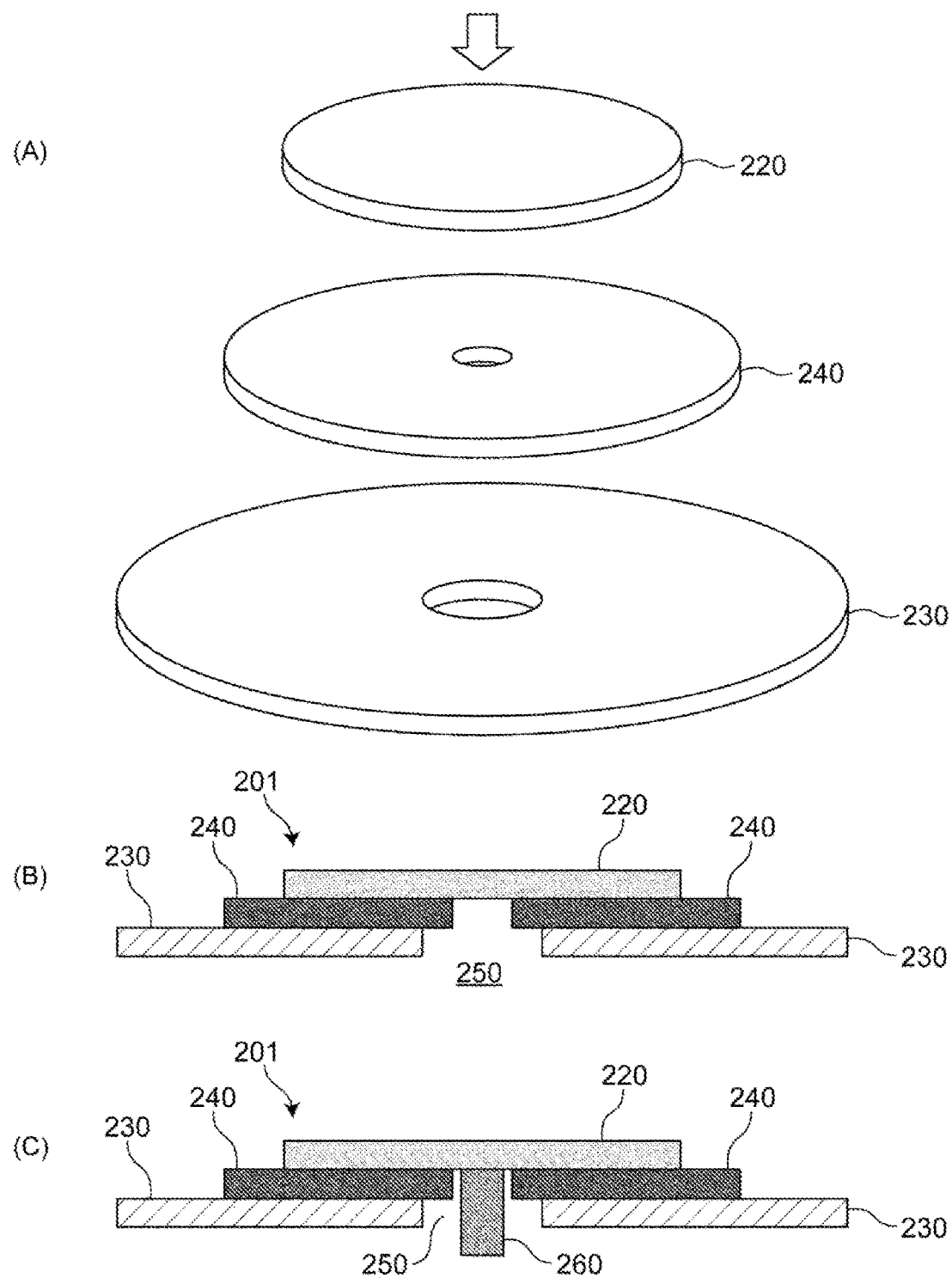
FIG. 11 is a schematic view schematically illustrating a configuration around an electrode terminal of a secondary battery the related art.

The secondary battery of the present disclosure, particularly the configuration near the electrode terminal (or the terminal member) can be produced in the same manner as the known method in the related art using the metal plate having the bent portion and the exterior body (refer to FIG. 11).

Specifically, by stacking a metal plate, an insulating material having a cavity, and an exterior body similarly having a cavity in this order and pressurizing the laminate while heating the laminate, the configuration near the electrode terminal (or the terminal member) can be formed.

Each of the metal plate having the bent portion and the exterior body can be produced by punching, pressing, laser processing, or the like of a metal member.

In addition, since the bent portion in the metal plate and the exterior body can be allowed within the range defined in the present specification, for example, the life cycle (replacement cycle) of a mold used in punching or pressing can be lengthened (generally, in punching or pressing, since the mold is deformed with the number of times of use, when the life cycle of the mold approaches the end of use, undesirable bending occurs and the mold has to be replaced. However, such bending can also be allowed as the above-described "bent portion", and thus the life cycle (replacement cycle) of the mold can be lengthened.). Furthermore, burrs and the like may also be generated in the punching, but such burrs can also be allowed as the above-described "bent portion", and thus, it is not necessary to perform burr removal work and the like which are necessary in the related art, and the production cost of the secondary battery can be significantly reduced.

Although one or more embodiments of the present application have been described above, only typical examples have been illustrated. Therefore, those skilled in the art will readily understand that the present application is not limited thereto, and various aspects are conceivable.

For example, in the above description, mainly button-shaped (or coin-shaped) and square-shaped secondary batteries have been mentioned (FIG. 9), but the present application is not necessarily limited thereto. That is, the plan view shape of the secondary battery of the present disclosure is not limited to a circular shape or a square shape, and may have any other geometric shape. Similarly, the shape of the terminal member (particularly, the plan view shape) is not necessarily limited to a substantially rectangular shape or a substantially quadrangular shape, and may have another geometric shape such as a substantially circular shape.

The term "circular shape or substantially circular shape" as used herein is not limited to a perfect circular shape (that is, simply "circle" or "perfect circle"), and includes a shape that can be usually included in "round shape" as recognized by those skilled in the art while being changed from the perfect circular shape. For example, not only the circle and the perfect circle but also the circular arc may have a locally different curvature, and furthermore, the circular arc may have a shape derived from the circle such as an ellipse and the perfect circle. In a typical example, a battery having such a circular shape in plan view corresponds to a so-called button-shaped or coin-shaped battery.

Further, in the above description, the drawings on the premise that the electrode assembly particularly has the planar stacking type structure are referred to, but the present application is not necessarily limited to the electrode assembly having the planar stacking type structure. That is, the present application may be premised on an electrode assembly having a wound type structure as long as the electrode assembly is not characteristic of a planar stacking type structure, or may be premised on an electrode assembly having a stack and folding type structure.

INDUSTRIAL APPLICABILITY

The secondary battery of the present application can be used in various fields where electric storage is assumed. Although it is merely an example, the secondary battery of the present disclosure can be used in the fields of electricity, information, and communication in which electricity, electronic equipment, and the like are used (for example, electric and electronic equipment fields or mobile equipment fields including mobile phones, smartphones, notebook computers and digital cameras, activity meters, arm computers, electronic papers, and wearable devices, and small electronic machines such as RFID tags, card type electronic money, and smartwatches), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a submersible), and the like.

DESCRIPTION OF REFERENCE SYMBOLS

1: Positive electrode
2: Negative electrode
3: Separator
5: Electrode constituting layer
10, 110: Electrode assembly
20, 30, 100: Secondary battery
21, 31, 41, 51, 61, 101, 201: Electrode terminal
22, 32, 42, 52, 62, 120, 220: Metal plate
23, 33, 43, 53, 63, 130, 230: Exterior body
24, 34, 44, 54, 64, 140, 240: Insulating material
25, 35, 45, 55, 65, 150, 250: Cavity
26, 36, 160, 260: Tab (electrode terminal side)
27, 37, 170: Tab (exterior body side)

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   an electrode assembly;
   an exterior body that houses the electrode assembly; and
   a metal plate joined to the exterior body via an insulating material interposed therebetween,
   wherein
   the exterior body has a cavity,
   one or both of a peripheral edge of the cavity and an outer edge of the metal plate is bent so as to be separated from the insulating material, and
   wherein the metal plate does not have any portion bent toward the insulating material.

2. The secondary battery according to claim 1, wherein both of the peripheral edge of the cavity and the outer edge of the metal plate are bent so as to be separated from the insulating material.

3. The secondary battery according to claim 1, wherein the insulating material has an increased thickness around the bent portion.

4. The secondary battery according to claim 3, wherein the insulating material is in contact with the bent portion.

5. The secondary battery according to claim 1, wherein one of the peripheral edge of the cavity and the outer edge of the metal plate is bent toward the insulating material.

6. The secondary battery according to claim 1, wherein one or both of a bent portion of the peripheral edge of the cavity is provided on an entire circumference of the cavity, and a bent portion of the outer edge of the metal plate is provided on an entire circumference of the metal plate.

7. The secondary battery according to claim 6, wherein one or both of the bent portion of the peripheral edge of the cavity and the bent portion of the outer edge of the metal plate is a corner configured to enter into the insulating material.

8. The secondary battery according to claim 1, wherein the metal plate is an electrode terminal.

9. The secondary battery according to claim 8, wherein the electrode terminal is a positive electrode, and the exterior body is a negative electrode.

10. The secondary battery according to claim 8, wherein the electrode terminal is a negative electrode, and the exterior body is a positive electrode.

11. The secondary battery according to claim 1, wherein the exterior body is a metal exterior body, and the metal exterior body has a two-part configuration of a cup-shaped member and a lid-shaped member.

12. The secondary battery according to claim 1, wherein the secondary battery is a button cell shape or a coin cell shape.

13. The secondary battery according to claim 1, wherein the electrode assembly includes a positive electrode and a negative electrode capable of occluding and releasing lithium ions.

14. A secondary battery comprising:
    an electrode assembly;
    an exterior body that houses the electrode assembly; and
    a metal plate joined to the exterior body via an insulating material interposed therebetween,
    wherein
    the exterior body has a cavity,
    a peripheral edge of the cavity is bent so as to be separated from the insulating material, and
    the metal plate is flat.

15. The secondary battery according to claim 1, wherein ends of the metal plate are facing away from the insulating material.

16. The secondary battery according to claim 14, wherein the insulating material has an increased thickness around the bent portion.

17. The secondary battery according to claim 16, wherein the insulating material is in contact with the bent portion.

18. The secondary battery according to claim 14, wherein the secondary battery is a button cell shape or a coin cell shape.

19. The secondary battery according to claim 14, wherein the electrode assembly includes a positive electrode and a negative electrode capable of occluding and releasing lithium ions.

20. The secondary battery according to claim 14, wherein the metal plate is an electrode terminal, and one of:
    the electrode terminal is a positive electrode, and the exterior body is a negative electrode; or
    the electrode terminal is a negative electrode, and the exterior body is a positive electrode.

* * * * *